Patented May 10, 1938

2,117,058

UNITED STATES PATENT OFFICE 2,117,058

METHOD OF PRESERVING GREEN FODDER AND PRODUCT

Robert G. Ferris, Harvard, Ill., assignor to Starline, Inc., Harvard, Ill., a corporation of Illinois No Drawing. Application April 8, 1937,
Serial No. 135,818

6 Claims. (Cl. 99—8)

This invention is a method of preserving green fodder and a product for such use.

The usual hay crops, such as alfalfa, clover, etc., contain more nourishment if mowed while young before valuable nutritive matter has been transformed to cellulose. Certain other plants are highly nourishing when young, but become entirely useless as they mature. It is, therefore, desirable to mow such crops while young and preserve them until needed for use. Furthermore, certain grain crops, like oats, can often be used once for young green fodder and still mature a full grain crop, and this is desirable if the young and green material can be preserved. Making hay of this very young green material by ordinary sun drying is generally impractical and is somewhat destructive of the nutritive value.

As set forth in my copending application Ser. No. 11,163, filed March 14, 1935, now issued as Patent No. 2,084,797, June 22, 1937, these objections may be overcome by the use of sulfur dioxide in the manner therein described, by impregnating the green fodder with a gas. The present invention is an improvement upon the process therein described. In the present process a gaseous preservative comprising phosphorus pentoxide is used as the impregnating medium. Preferably the phosphorus pentoxide is generated by the use of a phosphorus-sulfur compound or mixture, preferably phosphorus pentasulfide ($P_2S_5$). This material may be provided in stick or candle form and is simply burned to produce the gaseous preservative.

The preferred impregnation method is that described in my copending application 11,163, filed March 14, 1935, which may be conveniently carried out in an ordinary silo provided with the usual doors located at different levels in a vertical line. It is a common practice in filling silos to close two or three doors above the level of the accumulated silage and to close additional doors as the level rises. In practicing the present method, the phosphorus material is burned in a suitable receptacle hung from and preferably sufficiently below the lowest of the open doorways. The receptacle will thus be several feet at least above the bottom of the silo at the beginning and will remain this distance above the fodder level as the silo is filled. The hot gas from the burning material rises a short distance but quickly cools and descends by gravity, dispersing most of the air from the bottom of the silo. The level at which the silo is filled with a body of gas sufficiently dense to be an effective preservative is readily visible under normal conditions because of the smoke-like character of the gas due to the presence of $P_2O_5$ particles, the resulting gas forming a visible cloud with a fairly definite upper surface.

The material is burned until the cloud fills several feet at the bottom of the silo and the filling of the silo with the fodder chopped in short lengths is then commenced. The fodder is supplied by the usual silo filler and showers in through the top, falling through the preservative gas in separated, somewhat damp pieces. The fodder thus falling through and lodging in the gas body absorbs enough preservative to be effectually preserved. As the silo is filled, which may take days or weeks, or which may go on through an entire mowing season, the doors are closed to higher and higher levels and additional material is burned so that at all times while filling is going on the gas level is maintained several feet above the surface upon which the falling fodder comes to rest.

By this very simple method the fresh green and damp fodder may be thoroughly preserved against fermentation or putrefaction until needed for use.

The use of phosphorus containing materials as distinguished from sulfur alone has several advantages. In the first place, fodder apparently stays somewhat greener than with sulfur. Secondly, the phosphorus itself has some food value.

More important, particularly when used in combination with sulfur, the phosphorus has the very great advantage of producing a highly undesirable odor. Sulfur dioxide is extremely poisonous and yet its use is so common that there is some tendency for workmen to hold it in contempt. On the other hand, with the phosphorus the odor is unpleasant, and when $P_2S_5$ is used the odor is decidedly disagreeable, so that there is not the slightest danger of a workman's going into the gas-filled silo to recover a tool or other object.

Likewise, particularly when used in combination with sulfur, $P_2O_5$ apparently will operate successfully with a lower moisture content in the fodder than sulfur alone.

What I claim as new and desire to secure by Letters Patent is:

1. The method of treating green fodder with a gaseous preservative heavier than air, consisting of filling the bottom of a storage receptacle largely with a preservative gas including $P_2O_5$, showering the fodder through the layer of gas to the bottom of the receptacle, and supplying additional gas from time to time to maintain a level thereof substantially above that of the accumulated fodder while the latter is being added to the receptacle.

2. The method as set forth in claim 1, in which the gas also contains sulfur dioxide.

3. An article of manufacture for preservation of green fodder, a candle consisting essentially of $P_2S_5$.

4. The method of preserving green fodder which comprises impregnating the green fodder in a substantially closed chamber with a preservative gas including $P_2O_5$ and sulfur dioxide, and maintaining the impregnated fodder therein for a prolonged storage period.

5. The method as set forth in claim 4 in which the preservative gas consists essentially of $P_2O_5$ and sulfur dioxide.

6. The method as set forth in claim 4 in which the gaseous mixture is produced by burning phosphorus pentasulfide.

ROBERT G. FERRIS.